(12) United States Patent
Cong et al.

(10) Patent No.: US 8,788,855 B2
(45) Date of Patent: Jul. 22, 2014

(54) CLUSTER COMPUTATIONAL CAPACITY LEVEL SWITCHING BASED ON DEMAND PREDICTION AND STABILITY CONSTRAINT AND POWER CONSUMPTION MANAGEMENT

(75) Inventors: Lanlan Cong, Shanghai (CN); Renqi Zhu, Shanghai (CN); Yang Zhang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 378 days.

(21) Appl. No.: 13/241,614

(22) Filed: Sep. 23, 2011

(65) Prior Publication Data
US 2013/0080814 A1 Mar. 28, 2013

(51) Int. Cl.
*G06F 1/32* (2006.01)
(52) U.S. Cl.
USPC .......................................... 713/320; 713/340
(58) Field of Classification Search
None
See application file for complete search history.

(56) References Cited

U.S. PATENT DOCUMENTS

| | | | | |
|---|---|---|---|---|
| 7,562,234 B2* | 7/2009 | Conroy et al. | ................ | 713/300 |
| 7,822,967 B2 | 10/2010 | Fung | | |
| 8,046,767 B2* | 10/2011 | Rolia et al. | .................... | 718/104 |
| 8,190,939 B2* | 5/2012 | Fields et al. | .................. | 713/324 |
| 2011/0131425 A1 | 6/2011 | Banerjee et al. | | |

OTHER PUBLICATIONS

Zhang, Yang., "Power Management Solution in Windows HPC Server 2008 R2 (SP1) Monitoring Management Pack", Retrieved at <<http://blogs.technet.com/b/windowshpc/archive/2011/03/15/power-management-solution-in-windows-hpc-server-2008-r2-sp1-monitoring-management-pack.aspx>>, he Windows HPC Team Blog, Mar. 15, 2011, T pp. 3.

Verma, et al., "Power-aware Dynamic Placement of HPC Applications", Retrieved at <<http://www.cs.cmu.edu/~dga/15-849/S09/papers/HPC-Power.pdf>>, Proceedings of the 22nd annual international conference on Supercomputing, Jun. 7-12, 2008, pp. 175-184.

Chase, et al., "Balance of Power: Energy Management for Server Clusters", Retrieved at <<http://citeseerx.ist.psu.edu/viewdoc/download?doi=10.1.1.141.532&rep=rep1&type=pdf>>, In Proceedings of the 8th Workshop on Hot Topics in Operating Systems, May 2001, pp. 6.

Wang, et al., "Efficient Power Management of Heterogeneous Soft Real-Time Clusters", Retrieved at <<http://ieeexplore.ieee.org/stamp/stamp.jsp?tp=&arnumber=4700446>>, Proceedings of the 2008 Real-Time Systems Symposium, 2008, pp. 323-332.

Ranganathan, et al., "Ensemble-level Power Management for Dense Blade Servers", Retrieved at <<http://citeseerx.ist.psu.edu/viewdoc/download?doi=10.1.1.91.3453&rep=rep1&type=pdf>>, Proceedings of the 33rd annual international symposium on Computer Architecture, Jun. 17-21, 2006, pp. 12.

(Continued)

*Primary Examiner* — Kenneth Kim
(74) *Attorney, Agent, or Firm* — Kevin Sullivan; Kate Drakos; Micky Minhas

(57) ABSTRACT

Power consumption and computational availability of a cluster are automatically managed by monitoring consumption, predicting demand based on a job queue and/or historic data, and checking certain conditions and constraints. Threshold conditions for switching the cluster's capacity level are based on the current level and the predicted demand. Switching levels is avoided when a stability constraint would be violated. Cluster capacity levels can be uniformly or nonuniformly spaced, and may have decreasing gaps between levels as capacity decreases. Capacity level definitions and level switching conditions and constraints may be defaults and/or be provided by an administrator.

20 Claims, 2 Drawing Sheets

(56) References Cited

OTHER PUBLICATIONS

Zhong, Lin., "Disk-aware Request Distribution-based Web Server Power Management", Retrieved at <<http://citeseerx.ist.psu.edu/viewdoc/download?doi=10.1.1.4.3895&rep=rep1&type=pdf>>, Technical Report CE-04-ZPJ, Retrieved Date: Jun. 14, 2011, pp. 9.

"Computer cluster", Retrieved at <<http://en.wikipedia.org/wiki/Computer_cluster>>, Jul. 30, 2011, pp. 7.

* cited by examiner

CLUSTER COMPUTATIONAL CAPACITY LEVEL SWITCHING BASED ON DEMAND PREDICTION AND STABILITY CONSTRAINT AND POWER CONSUMPTION MANAGEMENT

BACKGROUND

Web server farms, load-balancing clusters, tightly-coupled compute clusters, and other groups of linked computers which work closely together and outwardly present the appearance of a single more powerful resource are referred to herein as "computational clusters". The electrical power used by a computational cluster to produce a given result may vary, depending on how efficiently the computational cluster is implemented and operated. For example, improved algorithms may allow computation of the same given result using fewer processing cycles, fewer memory accesses, and/or more localized (and faster) memory accesses. Similarly, optimizations may be possible which remove code execution paths or blocks of code that do not contribute to the given result. Hardware improvements may reduce chip or board power consumption without degrading performance. Measures which are not specific to the hardware or software of the computational cluster may also improve overall efficiency, such as reductions in the power consumption of air conditioning that keeps the cluster within acceptable operating temperatures.

SUMMARY

Balancing a cluster's power consumption against the cluster's computational availability can be challenging. At one extreme, always powering all available machines in a cluster provides complete computational availability, but also wastes electric power to the extent the availability is not actually used for computations. At the other extreme, powering up a cluster machine only after a demand is made for its computational capability wastes little or no power, but also imposes a delay between the time computations are demanded and the time they can be performed, reducing overall efficiency. It is not immediately clear how to find, and how to maintain, a balance between these extremes, and many different approaches are possible.

Some embodiments described herein help manage power consumption and computational availability by monitoring electrical power consumption of a computational cluster which is operating at a current cluster capacity level, and predicting demand for computational availability of the computational cluster. Electrical power consumption may be "monitored" directly, by measuring Joules, kilowatt-hours, or the like. Electrical power consumption may also be "monitored" indirectly, by measuring cluster utilization (used cores versus total cores, for example). In particular, some embodiments monitor the cluster utilization (used cores/total cores) and predict the future demand by job queue length to decide whether to switch the cluster capacity (available resources) from its current level to an adjacent level. In some embodiments, demand prediction is based at least on a job queue length; job priority, job wait time, and/or historic consumption data are also used in some embodiments. Other factors are not necessarily excluded from use in a demand predictor, although they may be excluded, depending on the embodiment.

After determining that a threshold condition for switching the computational cluster to a different cluster capacity level is satisfied, some embodiments make the switch, or at least recommend that the switch be made. The threshold condition is based at least on the current cluster capacity level and the predicted demand, in some embodiments. For instance, in some embodiments a threshold condition for decreasing capacity is met if sampled power consumption does not exceed a specified threshold for at least a specified number of consecutive samples and the number of jobs in a job queue does not exceed a specified number. In some, a threshold condition for switching to a higher cluster capacity level is met if the number of jobs in a job queue is at least a specified number. Other threshold conditions are also suitable.

Some embodiments ascertain whether switching the computational cluster to the different cluster capacity level will violate a stability constraint of the computational cluster. The stability constraint is based at least on a history of cluster capacity level switches within a period of time which is not earlier than a specified history cutoff, in some embodiments. In some, the stability constraint is based on a count of switches between cluster capacity levels and/or a frequency of switches between cluster capacity levels.

Some embodiments monitor electrical power consumption at sample points, e.g., for a fraction of a second at several sample times which are spaced minutes apart. Some monitor electrical power consumption for a time period, e.g., for at least ten minutes, or for another specified period which is longer than a single sample point.

In some embodiments, the cluster capacity levels are uniformly spaced. For example, levels may be defined at 100%, 90%, 80%, 70%, ..., 10%, and 0% of total cluster computational capacity, with a uniform spacing of 10%. Spacing pertains to the levels defined, and applies regardless of whether all possible levels are defined. Thus, levels defined at 100%, 80%, and 60% of total capacity are uniformly spaced with a 20% gap between each two adjacent levels, even though they are the only levels defined and 60% rather than 0% is the minimum defined level. In other embodiments, the cluster capacity levels are nonuniformly spaced, and some of these embodiments have decreasing gaps between levels as capacity decreases, e.g., 100%, 80%, 65%, 55%, 50%. Geometric, logarithmic, and other level spacing regimes may be used. Regardless of whether spacing between levels is uniform, and whether it is decreasing, some embodiments have a nonzero minimum capacity level, while others do not. Capacity level definitions may be defaults and/or user-provided, and may define capacity in absolute terms (e.g., N processors of speed S, M terabytes of memory) and/or in relative terms as a percentage of total capacity. Capacity may be processing capacity, storage capacity, latency, based on actual hardware, based on virtual machines, and/or may reflect any other measure of computational availability.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
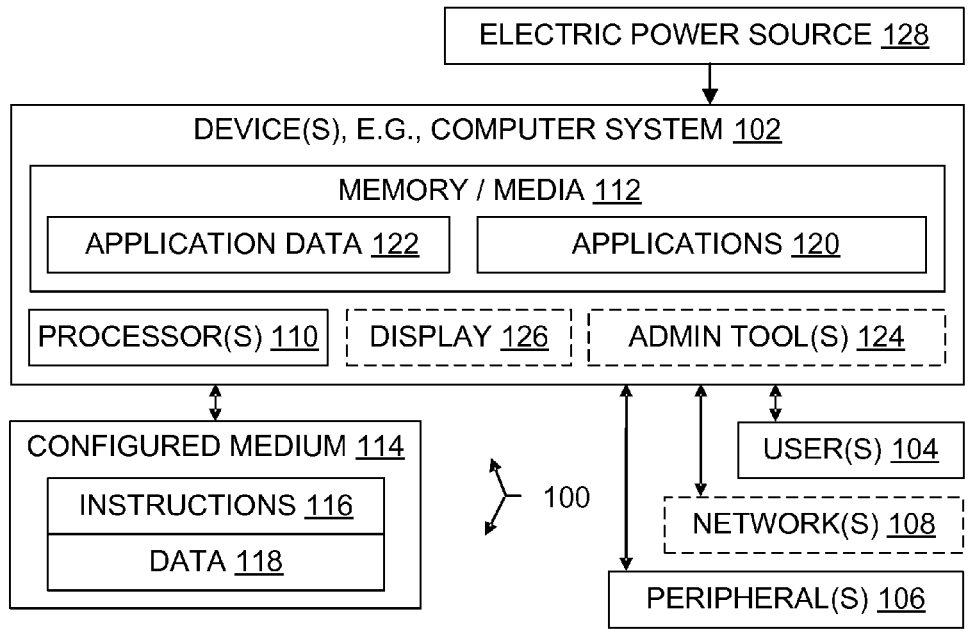
FIG. 1 is a block diagram illustrating a computer system having at least one processor, at least one memory, one or more applications (which may be user-facing, server-side, part of a distributed program, etc.), and other items in an operating environment which may be present on multiple network nodes, and also illustrating configured storage medium embodiments.

As a computing center grows larger to satisfy increasing business demands, the energy (electric power) it consumes can become a high cost for day-to-day operation. Power costs are incurred even when the cluster is not fully utilized, with some servers sitting idle but still consuming power. The inefficiency of power usage becomes a challenge. Some computing center administrators manage power efficiency manually, by powering off some servers when they are idle and powering them back on at busy times. However, such manual power management introduces significant overhead to daily operations, may still lead to overconsumption of power, introduces boot-time and other latencies, and also increases administrator workload because the administrator is called on to watch the computing center load closely and continually.

Some embodiments described herein provide a consumption-based power management solution as an effective way for cluster administrators (a.k.a. admins) to increase power usage efficiency. Efficiency can be calculated as workload compared to consumed power, or as throughput compared to consumed power, or using other familiar efficiency metrics.

For example, some embodiments provide three levels of cluster capacity. When a cluster consumption condition (a.k.a., threshold condition and possibly also a stability condition) is met, the cluster will switch from one capacity level to an adjacent capacity level. Capacity level switches may increase the available computational capacity, or decrease that capacity, according to the circumstances. Some embodiments measure current cluster consumption and also measure potential consumption by job queue length. In some embodiments, thresholds for switching capacity levels are easily configurable by cluster admins so they can be tailored to a particular computing center environment. Other features of various embodiments are also discussed below.

Some embodiments described herein may be viewed in a broader context. For instance, concepts such as power consumption, computational capacity, latency, demand, stability, and history may be relevant to a particular embodiment. However, it does not follow from the availability of a broad context that exclusive rights are being sought herein for abstract ideas; they are not. Rather, the present disclosure is focused on providing appropriately specific embodiments. Other media, systems, and methods involving power consumption, computational capacity, latency, demand, stability, and/or history are outside the present scope. Accordingly, vagueness and accompanying proof problems are also avoided under a proper understanding of the present disclosure.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment. A computational cluster (as defined in the Background) is an example of a computer system 102 which may be configured according to the teachings herein.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Program" is used broadly herein, to include applications, kernels, drivers, interrupt handlers, libraries, and other code written by programmers (who are also referred to as developers).

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine. However, "automatically" does not necessarily mean "immediately".

"Computationally" means a computing device (processor plus memory, at least) is being used, and excludes obtaining a computational result by mere human thought or mere human action alone. For example, doing arithmetic with a paper and pencil is not doing arithmetic computationally as understood herein.

Throughout this document, use of the optional plural "(s)", "(es)", or "(ies)" means that one or more of the indicated feature is present. For example, "index(es)" means "one or more indexes" or equivalently "at least one index".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as ascertaining, configuring, decreasing, defining, determining, exceeding, executing, getting, identifying, including, increasing, measuring, meeting, monitoring, obtaining, operating, predicting, receiving, residing, sampling, specifying, switching, using (or ascertains, ascertained, configures, configured, and so on) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory thereby transforming it to a particular article, as opposed to simply existing on paper, in a person's mind, or only as a signal on a wire, for example.

Operating Environments

With reference to FIG. 1, an operating environment 100 for an embodiment may include a computer system 102; a computational cluster is an example of a computer system 102. In general, the computer system 102 may be a multiprocessor computer system, or not, but a computational cluster includes multiple processors located in one or more machines.

An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, and/or in other ways. The computer system 102 receives electric power from an internal and/or external power source 128, which provides power in a way that allows power consumption to be measured.

Human users 104 may interact with the computer system 102 by using displays, keyboards, and other peripherals 106. System administrators, developers, engineers, and end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, and/or optical media, as opposed to merely a signal. In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a computer-readable storage medium 112. Some other examples of computer-readable storage media 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by power consumption and availability management as discussed herein.

Applications 120, application-specific data 122, admin tools 124, other software, and other items shown in the Figures and/or discussed in the text may reside partially or entirely within one or more media 112, thereby configuring those media. In addition to processor(s) 110 and memory 112, an operating environment may also include other hardware, such as display(s) 126, buses, power supplies, and accelerators, for instance.

One or more items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
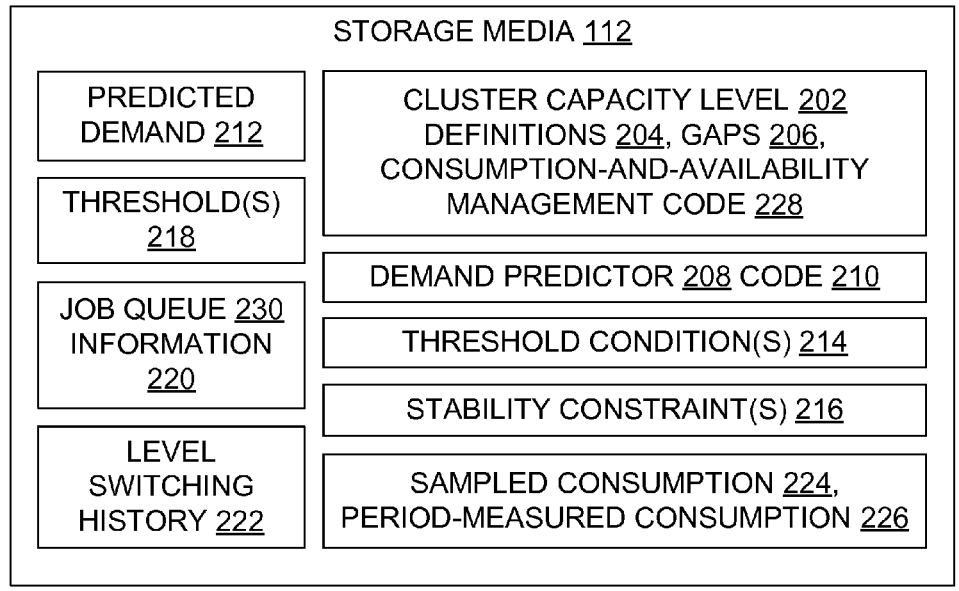
FIG. 2 is a block diagram illustrating aspect of power consumption and availability management in an example architecture.

FIG. 2 illustrates an architecture which is suitable for use with some embodiments. Computational cluster capacity levels 202 are defined by definitions 204 which specify, for instance, percentages of total computational capacity or an absolute number of processors, memory bytes, etc. Gaps 206 between the levels 202 (also called spaces) are measured in percentage points, processor counts, memory bytes, and/or in other measurements that correspond to the level definitions 204.

In the illustrated architecture, as in some others, a demand predictor 208 includes software code 210 and corresponding processing hardware which provides predictions 212 of demand on the computational cluster. Job queue 230 information 220 such as queue length, job wait time, and/or job priority, may be used by a demand predictor 208 to calculate a predicted demand 212. The demand predictor code 210 may be part of a consumption-and-availability management code 228, or may be called on by code 228, depending on the embodiment. The management code 228 operates to make recommendations (and/or to take actions) for switching cluster capacity in order to manage power consumption and computational availability in a balanced manner as described herein.

Threshold conditions 214 are used in the management code 228 to decide when part of the computational cluster should be powered up, made active, placed on standby (as opposed to active), or powered down. In some embodiments, active/standby status is not used, and only power-up and power-down recommendations are made when balancing computational availability against electric power consumption.

Stability constraints 216 may be viewed as part of a threshold condition 214, or they may be viewed as separate considerations that can override satisfaction of a threshold condition. The difference between these views is convenience, not functionality.

Thresholds 218 are values used in threshold conditions 214 and/or in stability constraints 216; particular thresholds are also referred to herein as a number or a period. Particular thresholds 218 may be calculated values based on efficiency statistics, may be default values, and/or may be provided (and possibly changed from time to time) by an administrator.

Level switching history 222 includes information such as what switches were made, how many were made, when they were made, and/or in what time period they were made, depending on the embodiment. Level switching history 222 is used with stability constraints 216 in management code 228 to help prevent unacceptable frequent or numerous power-ups and/or power-downs.

Power consumption is measured at sample points, as a sampled consumption 224 and/or measured over a period of time, as a period-measured consumption 226. Power consumption measurements may be made by familiar admin tools 124, by management code 228, or by other code which provides measurements to the management code 228.

In some embodiments, an administrative device or system 102 that uses management code 228 to monitor power consumption, make demand predictions, and check conditions for changing a cluster's capacity level is part of the computational cluster in question. In other embodiments the administrative system running the management code 228 is not part of the cluster being administered. A difference between these embodiments is whether the administrative system's own power usage is part of the monitored power usage. It is not expected that an administrative system would recommend powering itself down.

With reference to FIGS. 1 and 2, some embodiments provide a computer system 102 with a logical processor 110 and a memory medium 112 configured by circuitry, firmware, and/or software to transform a computational cluster by balancing power consumption against computational availability as described herein.

Some embodiments provide a computer system including logical processor(s) 110, and a memory 112 in operable communication with the logical processor(s); the memory may be on one or more machines. At least three cluster capacity level definitions 204 reside in the memory. A demand predictor 208 residing in the memory includes demand prediction code 210 which, when executed by the processor(s), will calculate a predicted demand 212 for computational availability of the computational cluster. The prediction 212 is based on information 220 from a job queue 230, either solely or in conjunction with other information, depending on the embodiment. In some embodiments, the demand predictor 208 calculation is based on job queue length, job priority, and job wait time. A threshold condition 214 residing in the memory is based on at least the predicted demand. The threshold condition is used when the management code 228 determines whether to recommend switching the computational cluster from a current one of the defined cluster capacity levels to a different one of the defined cluster capacity levels.

Some embodiments include definitions 204 of at least four consecutive cluster capacity levels 202. In some embodiments, level definitions 204 conform with at least one of the following: a uniform spacing between levels, a geometric sequence spacing between levels, a logarithmic spacing between levels.

In some embodiments, a particular threshold condition 214 is a condition for switching to a lower cluster capacity level 202. In some of these, the threshold condition includes a condition that is met when a sampled power consumption 224 level does not exceed a specified threshold 218 for at least a specified number 218 of consecutive samples and the number of jobs in a job queue does not exceed a specified number 218. In some, the threshold condition includes a condition that is met when power consumption 226 over a measured time period 218 does not exceed a specified threshold 218 and the number of jobs in a job queue does not exceed a specified number 218.

In some embodiments, a particular threshold condition 214 is a condition for switching to a higher cluster capacity level 202. In some of these, the threshold condition includes a condition that is met when the number of jobs in a job queue is at least a specified number 218.

In some embodiments, a threshold condition 214 includes a stability constraint 216 that is based on at least one of the following items from a level switching history 222: a count of switches between cluster capacity levels, a frequency of switches between cluster capacity levels. In some other embodiments, different stability constraints 216 are used, and in some embodiments no stability constraint is used.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Some embodiments operate in a "cloud" computing environment and/or a "cloud" storage environment in which computing services are not owned but are provided on demand. For example, a computational cluster may include multiple devices/systems 102 in a networked cloud, consumption measurements 224, 226 may be obtained by and initially stored on yet other devices within the cloud, the demand predictor code 210 may run on some other device, and the consumption-and-availability management code 228 may configure a display 126 on yet other cloud device(s)/system(s) 102 which are not necessarily part of the managed cluster.

Processes

Figure 3:
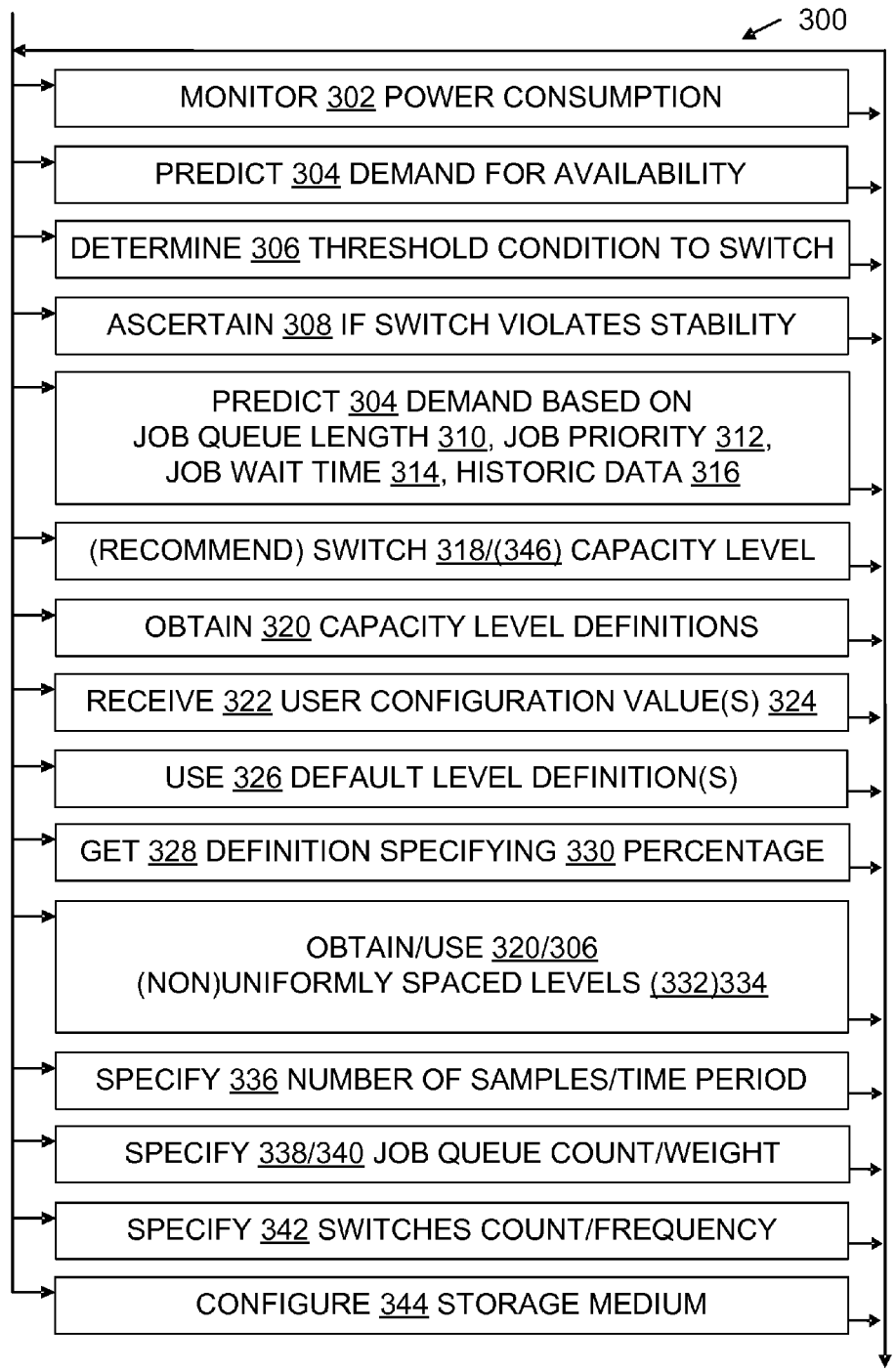
FIG. 3 is a flow chart illustrating steps of some process and configured storage medium embodiments.

FIG. 3 illustrates some process embodiments in a flowchart 300. Processes shown in the Figures may be performed in some embodiments automatically, e.g., by management code 228 fed with automatic consumption measurements 224, 226 and using established thresholds 218 and conditions 214, or otherwise requiring little or no contemporaneous user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

During a consumption monitoring step 302, an embodiment monitors electric power consumption of a managed computational cluster. Monitored consumption may be sampled or period-based, and may be actual (physical measurement-based) or user-estimated. Step 302 may be accomplished using familiar admin tools 124 and/or other mechanisms, for example.

During a demand predicting step 304, an embodiment predicts computational availability demand for some future instant and/or some future period. Step 304 may be accomplished using logic (software and processing hardware) which operates as described herein. In particular embodiments, step 304 predicts demand based on information 230 such as job queue length 310 (number of jobs in the queue), job priority 312, and/or job wait time 314 (how long a job has been waiting for a processor). In a given embodiment, prediction step 304 may alternately or additionally use historic data 316 by extrapolating future demand based on past demand.

During a switch determining step 306, an embodiment determines whether a threshold condition 214 for switching capacity levels is met. Step 306 may be accomplished using logic (software and processing hardware) which operates as described herein.

During a stability ascertaining step 308, an embodiment determines whether switching capacity levels will violate one or more stability constraints 216. Step 308 may be accomplished using logic (software and processing hardware) which operates as described herein.

During a capacity level switching step 318, an embodiment switches capacity levels, e.g., by automatically powering down or powering up machines in the managed computational cluster. Step 318 may be performed by familiar mechanisms under the direction of management code 228, for example.

During a switch recommending step 346, an embodiment recommends that the capacity level be changed, but does not actually perform the switch 318. A recommendation during step 346 may take the form of a message on a display 126, a text or email to an administrator 104, or use other familiar communication mechanism(s) under the direction of management code 228, for example.

During a level definition obtaining step 320, an embodiment obtains capacity level definition(s) 204, e.g., by querying an administrator and receiving 322 threshold(s) 218 defining gap(s) 206 between levels, by reading definition values 324 from a configuration file, and/or by using 326 default definitions 204.

In some cases with some embodiments, step 320 includes getting 328 capacity level definition(s) 204 that specify 330 a percentage of total cluster capacity, whereas in some cases absolute numbers rather than percentages are obtained 320.

In some cases some embodiments obtain 320 definitions 204 of nonuniformly spaced levels 332, and in some cases some embodiments obtain 320 definitions 204 of uniformly spaced levels 334. Likewise, determining 306 whether to switch levels may be done in the context of nonuniformly spaced levels or uniformly spaced levels. For definitional purposes, any set of level definitions which contains at least two different gaps 206 is considered nonuniformly spaced, even if some of the levels are uniformly spaced.

During a consumption threshold specifying step 336, a user (or an embodiment operating on behalf of a user) specifies thresholds 218 such as the number of samples to use for sampled consumption 224 measurement or the time period to use for period-measured consumption 226. Step 336 may be accomplished using a user interface, configuration file, and or other familiar mechanisms under the direction of management code 228, for example.

During demand prediction threshold specifying steps 338 and 340, a user (or an embodiment operating on behalf of a user) specifies thresholds 218 for job queue length 310 and job weighting (priority 312 and/or wait time 314). Steps 338 and 340 may be accomplished using a user interface, configuration file, and or other familiar mechanisms under the direction of management code 228, for example.

During a stability threshold specifying step 342, a user (or an embodiment operating on behalf of a user) specifies thresholds 218 such as the number of level switches or the frequency of level switches, to use in stability constraint(s) 216. Step 342 may be accomplished using a user interface, configuration file, and or other familiar mechanisms under the direction of management code 228, for example.

During a memory configuring step 344, a memory medium 112 is configured by a demand predictor 208, threshold condition(s) 214, stability constraint(s) 216, management code 228, and/or otherwise in connection with balancing computational availability against power consumption as discussed herein.

The foregoing steps and their interrelationships are discussed in greater detail below, in connection with various embodiments.

Some embodiments provide a process for managing power consumption and computational availability. The process includes predicting 304 demand for computational availability of a computational cluster (e.g., based on job queue length), and determining 306 that a threshold condition for switching the computational cluster to a different cluster capacity level is satisfied. In some embodiments, the threshold condition is based at least on the current cluster capacity level and the predicted demand. Some embodiments also include ascertaining 308 whether switching the computational cluster to the different cluster capacity level will violate a stability constraint 216 of the computational cluster. In some cases, the stability constraint is based at least on a history 222 of cluster capacity level switches within a period of time which is not earlier than a specified 342 history cutoff.

Some embodiments include monitoring 302 electrical power consumption of the computational cluster, which is operating at some current cluster capacity level 202 in the range from zero capacity to full capacity. In some embodiments, monitoring 302 may monitor electrical power consumption 224 at sample points, e.g., at four points, six points, or another number 218. In some, monitoring 302 may monitor electrical power consumption 226 for a time period, e.g., at least ten minutes, or thirty minutes, or another period 218. The current cluster capacity level may be confirmed, or be identified, based on the monitoring results.

In some embodiments, the predicting step predicts 304 demand 212 for computational availability of the computational cluster based on job queue length and on at least one of the following: job priority, job wait time. In some, demand 212 is based on job queue length and on historic consumption data.

In some embodiments, the process further includes switching 318 the computational cluster to one of at least two other cluster capacity levels (at least three levels being present). In some embodiments, the cluster capacity levels 202 are uniformly spaced, and in some they are nonuniformly spaced. In some cases, nonuniformly spaced levels 202 have decreasing gaps 206 between levels as capacity decreases from level to level. In some cases, the defined cluster capacity levels 202 include a nonzero minimum capacity level, and in others they include a zero capacity level.

Some embodiments merely recommend 346 switching the computational cluster to the different cluster capacity level, without actually switching it. Some will recommend 346 a level switch and will also perform 318 the switch if it is (i) expressly approved by an administrator and/or (ii) not expressly disapproved within a timeout period, depending on the embodiment.

In some embodiments, the obtaining step 320 includes receiving 322 a cluster capacity level definition from a user. In some, obtaining 320 includes using a previously specified default cluster capacity level definition. In some, obtaining 320 includes getting 328 a cluster capacity level definition which specifies a percentage of total cluster capacity, getting a cluster capacity level definition which specifies capacity in absolute terms that include a number of storage bytes, and/or getting a cluster capacity level definition which specifies capacity in absolute terms that include a number of processors.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (as opposed to propagated signal media). The storage medium which is configured may be in particular a removable storage medium 114 such as a CD, DVD, or flash memory. A general-purpose memory, which may be removable or not, and may be volatile or not, can be configured into an embodiment using items such as threshold conditions 214, stability constraints 216, and management code 228, in the form of data 118 and instructions 116, read from a removable medium 114 and/or another source such as a network connection, to form a configured medium. The configured medium 112 is capable of causing a computer system to perform process steps for transforming data through consumption and availability balancing as disclosed herein. FIGS. 1 through 3 thus help illustrate configured storage media embodiments and process embodiments, as well as system and process embodiments. In particular, any of the process steps illustrated in FIG. 3, or otherwise taught herein, may be used to help configure a storage medium to form a configured medium embodiment.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

The following discussion is derived from Windows® HPC Server 2008 R2 Monitoring Management Pack documentation (mark of Microsoft Corporation). Windows® HPC Server is a program implemented by Microsoft Corporation. Aspects of the Windows® HPC Server program and/or documentation are consistent with or otherwise illustrate aspects of the embodiments described herein. However, it will be understood that Windows® HPC Server documentation and/or implementation choices do not necessarily constrain the scope of such embodiments, and likewise that Windows® HPC Server and/or its documentation may well contain features that lie outside the scope of such embodiments, and do not necessarily implement every embodiment aspect described herein. It will also be understood that the discussion below is provided in part as an aid to readers who are not necessarily of ordinary skill in the art, and thus may contain and/or omit details whose recitation below is not strictly required to support the present disclosure.

Some solutions can be built upon Microsoft® System Center Operations Manager (SCOM) (mark of Microsoft Corporation) which provides flexibility to monitor a cluster's status, manage rules and conditions, and adjust thresholds easily. In one approach, a consumption-based power management rule defines three cluster capacity levels: high capacity (configurable default is 100%), medium capacity (configurable default 80%) and low capacity (configurable default 60%). This solution monitors the cluster consumption (cores in use/total available cores) by sampling every five minutes. If the consumption is less than 40% (configurable threshold) for six (configurable) consecutive sampling points, and the job queue length is less than one (configurable), this solution will switch the cluster from its current capacity level to a lower level. For example, if current capacity level is 100%, it will try to hibernate 20% of the servers to achieve the medium level of capacity. On the other side, if the job queue length is larger than five (configurable), the solution will switch the cluster from the current capacity level to a higher level to satisfy the increasing workload.

The foregoing solution, and others, can be represented by a finite state diagram in which capacity levels 202 are nodes and transitions between nodes are labeled with threshold conditions 214. For instance, one such state diagram has three nodes, named 100%, 80%, and 60%. The transition from 100% to 80% and the transition from 80% to 60% are each labeled with condition "Job queue length<1 and consumption<40% for 6 consecutive sampling points". The transition from 60% to 80% and the transition from 80% to 100% are each labeled with condition "Job queue length>5".

Some approaches implement a power management solution with one or more configurable rules. Some use a "Calendar-based Power Management Rule" and some use a "Consumption-based Power Management Rule".

Under a Calendar-based Power Management Rule an administrator (or management software acting on behalf of an administrator) can define a certain time period in a day when a specified portion of the compute nodes in a cluster will be hibernated to save power. This policy can be configured in some cases to only apply for certain days in a week.

Under a Consumption-based Power Management Rule an administrator (or management software acting on behalf of an administrator) can evaluate cluster utilization over a time period with the number of queued jobs and decide whether to hibernate a portion of the compute nodes to save power. One such approach has three defined levels of cluster capability and each time the hibernate condition (i.e., the threshold condition 214 to decrease capacity) is met, the cluster will change from its current capability level to a lower level. On the other hand, when the wake up condition (i.e., the threshold condition 214 to increase capacity) is met, the cluster will change from its current capacity level to a higher level.

In some approaches, both of the above rules are disabled by default. An admin is able to turn them on and configure them, e.g., after importing Windows® HPC Server 2008 R2 Monitoring Management Pack into SCOM server or with other suitable technology (mark of Microsoft Corporation). Shown below is one suitable set of configuration values, which an admin can override for the two rules, including one set of default values, with the understanding that other configuration values and defaults may be suitable in other situations:

| Parameter Name | Default Value | Notes |
|---|---|---|
| Calendar-based Rule | | |
| Enabled | False | The rule is disabled by default |
| Start Time | 22:00 | The time each day when power-saving mode for compute node starts. |
| End Time | 7:00 | The time each day when power-saving mode for compute node ends. |
| Exclude Days | | A list of days each week when compute nodes are excluded from entering power-saving mode. The "exclude days" format is like: "Saturday, Sunday" |
| Power On Percentage | 60 | The percentage of compute nodes that will remain powered on during the power-saving mode |
| Consumption-based Rule | | |
| Enabled | False | The rule is disabled by default |
| HighCapacityLevel | 100 | The percentage of high compute node capacity definition |
| MediumCapacityLevel | 80 | The percentage of medium compute node capacity definition |
| LowCapacityLevel | 60 | The percentage of low compute node capacity definition |
| UpperQueueLength | 2 | The length of the job queue above which the rule can cause the compute nodes to reach a higher capacity level |
| LowerQueueLength | 1 | The length of the job queue below which the rule can cause the compute nodes to reach a lower capacity level |
| LowConsumption | 40 | The compute node consumption percentage below which the rule can cause the compute nodes to reach a lower capacity level |
| Number of Samples | 6 | The number of samples to identify the LowConsumption which can push the compute nodes to enter a lower capacity level, the sampling interval is following "interval seconds" |
| Interval Seconds | 300 | The sampling interval, default is 300 seconds. |

In some embodiments, the gap between levels can become smaller and smaller, e.g., for risk-taking admins who favor saving power, or bigger and bigger, e.g., for risk-averse admins who favor computational availability. In some embodiments, an approach like the following is taken.

Assumptions:

Maximum Capacity: Cmax (could be 100% by default)

Minimum Capacity: Cmin (could be 60% by default)

Levels of Capacity Degrees: Level (3 by default)

If the gap between maximum capacity and the $2^{nd}$ capacity is X, then the gap between $2^{nd}$ capacity and $3^{rd}$ capacity is aX, . . . the gap between m capacity and (m+1) capacity is defined as $a^{(m-1)}X$. When a>1, the gap is increasing, and when 0<a<1, the gap is decreasing, and when a=1, the gap between levels remains the same.

Then one has:

$$Cmax-Cmin=X+aX+\ldots+a^{(Level-2)}X=[1-a^{(Level-2)}]X/(1-a)(\text{if } a \mathrel{!}=1) \text{ OR } (Level-1)X(\text{if } a==1)$$

where X could be easily calculated.

In some embodiments, an approach like the following is taken. For simplicity, only set thresholds for "# of sampling points" or "duration of the time period" (per variation) and "job queue length" or "SUM(JobPriority*JobWaitTime)" can be auto-adjusted if shaking too frequently.

Some algorithmic approaches are:

```
If (Times of capacity level changes > = 4 (configurable) in the last 90
mins (configurable))
{
   # of consecutive sampling points + = 2 (configurable) OR Duration of
time period + = 10 mins (configurable)
AND/OR
# of job queue length + = 1 (configurable) OR SUM(JobPriority *
JobWaitTime) + = X (configurable) to switch from a lower level to a
higher level
AND/OR
# of job queue length - = 1 (configurable, # of job queue length
threshold not less than 1) OR SUM(JobPriority * JobWaitTime) - = Y
(configurable) to switch from a higher level to a lower level
}
```

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIG. 3 also help describe configured media, and help describe the operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computer-readable storage medium configured with data and with instructions that when executed by at least one processor causes the processor(s) to perform a process for managing computational availability of a computational cluster which is operating at a current cluster computational capacity level, the process comprising the steps of:

predicting demand for computational availability of the computational cluster based at least on a job queue length, the job queue length being the number of jobs in a job queue, each job comprising code which is subject to scheduling;

determining that a threshold condition for switching the computational cluster to a different cluster computational capacity level is satisfied, the threshold condition based at least on the current cluster computational capacity level and the predicted demand;

ascertaining whether switching the computational cluster to the different cluster computational capacity level will violate a stability constraint of the computational cluster, the stability constraint based at least on a history of cluster computational capacity level switches within a period of time which is not earlier than a specified history cutoff; and performing at least one of the following: (i) switching the computational cluster to the different cluster computational capacity level after determining that the threshold condition for switching is satisfied and ascertaining that switching the computational cluster to the different cluster computational capacity level will not violate the stability constraint, (ii) recommending to a user that the computational cluster be switched to the different cluster computational capacity level, (iii) recommending to a user that the computational cluster not be switched to the different cluster computational capacity level.

2. The configured medium of claim 1, wherein the process further comprises monitoring electrical power consumption of the computational cluster at sample points.

3. The configured medium of claim 1, wherein the process further comprises monitoring electrical power consumption of the computational cluster for a time period of at least ten minutes.

4. The configured medium of claim 1, wherein the predicting step predicts demand for computational availability of the computational cluster based on job queue length and on at least one of the following: job priority, job wait time.

5. The configured medium of claim 1, wherein the predicting step predicts demand for computational availability of the computational cluster based on job queue length and on historic power consumption data.

6. The configured medium of claim 1, wherein the process further includes switching the computational cluster to one of at least two other cluster computational capacity levels (at least three levels being present), and the cluster computational capacity levels are uniformly spaced.

7. The configured medium of claim 1, wherein the process further includes switching the computational cluster to one of at least two other cluster computational capacity levels (at least three levels being present), and the cluster computational capacity levels are nonuniformly spaced, with decreasing gaps between levels as capacity decreases.

8. A computer-readable storage medium configured with data and with instructions that when executed by at least one processor causes the processor(s) to perform a process for managing computational availability, the process comprising the steps of:
   obtaining at least three cluster computational capacity level definitions, the defined cluster computational capacity levels including a nonzero minimum computational capacity level;
   predicting demand for computational availability of the computational cluster based on at least one of the following: (i) information from a job queue containing jobs which comprise code that is subject to scheduling, (ii) historic power consumption data;
   determining that a threshold condition for switching the computational cluster from a current cluster computational capacity level to a different cluster computational capacity level is satisfied, the threshold condition based at least on the predicted demand and on an indication of current cluster power consumption;
   ascertaining that switching the computational cluster to the different cluster computational capacity level will not violate a user-configurable stability constraint of the computational cluster, the user-configurable stability constraint based at least on a history of cluster computational capacity level switches within a user-specified period of time; and
   recommending to a user whether or not the computational cluster should be switched to the different cluster computational capacity level.

9. The configured medium of claim 8, wherein the process further comprises at least one of the following:
   monitoring electrical power consumption of the computational cluster for at least four sample points, and identifying the current cluster computational capacity level based on results of the monitoring;
   monitoring electrical power consumption of the computational cluster for a time period of at least thirty minutes, and identifying the current cluster computational capacity level based on results of the monitoring.

10. The configured medium of claim 8, wherein the predicting step predicts demand for computational availability of the computational cluster based at least on job priority information from a job queue.

11. The configured medium of claim 8, wherein the obtaining step comprises at least one of the following listed steps:
   receiving a cluster computational capacity level definition from a user;
   using a previously specified default cluster computational capacity level definition;
   getting a cluster computational capacity level definition which specifies a percentage of total cluster capacity;
   getting a cluster computational capacity level definition which specifies capacity in absolute terms that include a number of storage bytes;
   getting a cluster computational capacity level definition which specifies capacity in absolute terms that include a number of processors.

12. The configured medium of claim 11, wherein the process comprises at least two of the listed steps.

13. The configured medium of claim 8, wherein the obtaining level obtains definitions of at least three cluster computational capacity levels which are nonuniformly spaced.

14. A computer system comprising:
   logical processor(s);
   a memory in operable communication with the logical processor(s);
   at least three cluster computational capacity level definitions residing in the memory;
   a demand predictor residing in the memory and including demand prediction code which when executed by the processor(s) will calculate a predicted demand for computational availability of the computational cluster, based on information from a job queue containing jobs which comprise code that is subject to scheduling;
   a threshold condition for switching the computational cluster from a current one of the defined cluster computational capacity levels to a different one of the defined cluster computational capacity levels, the threshold condition residing in the memory and based on at least the predicted demand, and wherein the threshold condition comprises a stability constraint that is based on at least one of the following: a count of switches between cluster computational capacity levels, a frequency of switches between cluster computational capacity levels; and
   code which upon execution by a processor performs at least one of the following: (i) switches the computational cluster to the different cluster computational capacity level after determining that the threshold condition for switching is satisfied and ascertaining that switching the computational cluster to the different cluster computational capacity level will not violate the stability constraint, (ii) recommends to a user that the computational cluster be switched to the different cluster computational capacity level, (iii) recommends to a user that the computational cluster not be switched to the different cluster computational capacity level.

15. The system of claim 14, comprising definitions of at least four consecutive cluster computational capacity levels which conform with at least one of the following: a uniform spacing between levels, a geometric sequence spacing between levels, a logarithmic spacing between levels.

16. The system of claim 14, wherein the threshold condition is a condition for switching to a lower cluster computational capacity level, and the threshold condition comprises a condition that is met when a sampled power consumption level does not exceed a specified threshold for at least a specified number of consecutive samples and the number of jobs in a job queue does not exceed a specified number.

17. The system of claim 14, wherein the threshold condition is a condition for switching to a higher cluster computational capacity level, and the threshold condition comprises a condition that is met when the number of jobs in a job queue is at least a specified number.

18. The system of claim 14, wherein the threshold condition is a condition for switching to a lower cluster computational capacity level, and the threshold condition comprises a condition that is met when power consumption over a measured time period does not exceed a specified threshold and the number of jobs in a job queue does not exceed a specified number.

19. The system of claim 14, wherein the threshold condition is based at least in part on the number of jobs in at least one job queue.

20. The system of claim 14, wherein the demand predictor calculation is based on job queue length, job priority, and job wait time.

* * * * *